United States Patent [19]
DePaoli

[11] Patent Number: 5,373,644
[45] Date of Patent: Dec. 20, 1994

[54] REFLEX LUMINOUS DOT SIGHTING INSTRUMENT WITH UNDESIRED DOT LIGHT BLOCKING

[76] Inventor: Alfred C. DePaoli, 1 Wyman St., Woburn, Mass. 01801

[21] Appl. No.: 981,012

[22] Filed: Nov. 24, 1992

[51] Int. Cl.⁵ .................. G02B 27/34; F41G 1/32
[52] U.S. Cl. .................................. 33/241; 33/245; 42/103; 356/251
[58] Field of Search .......... 33/241, 244, 245, 246, 33/247, 248, 252; 42/100, 101, 103; 359/428, 601, 611, 612, 614; 356/251, 252

[56] References Cited

U.S. PATENT DOCUMENTS

| | | | |
|---|---|---|---|
| 2,596,522 | 5/1952 | Bethke | 33/241 |
| 3,315,362 | 4/1967 | Palmer | 33/244 |
| 3,963,356 | 6/1976 | Wiklund | 33/241 |
| 4,217,026 | 8/1980 | Radovich | 359/611 |
| 4,554,744 | 11/1985 | Huckenbeck | 33/241 |
| 4,658,139 | 4/1987 | Brennan et al. | 33/241 |
| 4,665,622 | 5/1987 | Idan | 33/241 |
| 4,764,011 | 8/1988 | Goldstein | 33/241 |
| 4,815,822 | 3/1989 | Bramhall | 359/601 |
| 4,859,058 | 8/1989 | Ekstrand | 33/241 |
| 5,205,044 | 4/1993 | DePaoli | 33/241 |

Primary Examiner—Thomas B. Will
Attorney, Agent, or Firm—Robert T. Dunn

[57] ABSTRACT

In a reflex luminous dot firearm sighting instrument that includes a housing having an objective end and an ocular end defining an optical axis, an LED and a battery and control circuit for the LED and a tilted reflecting window or lens in the housing having a reflective coating that reflects the LED light while transmitting target light so that the target viewed through the instrument has a luminous dot of LED light superimposed thereon, a contoured non-reflective surface is provided alongside the luminous dot light path between the LED and the tilted reflecting window or lens inside the instrument for blocking undesired reflections of LED light so that they do not reach the eye.

19 Claims, 3 Drawing Sheets

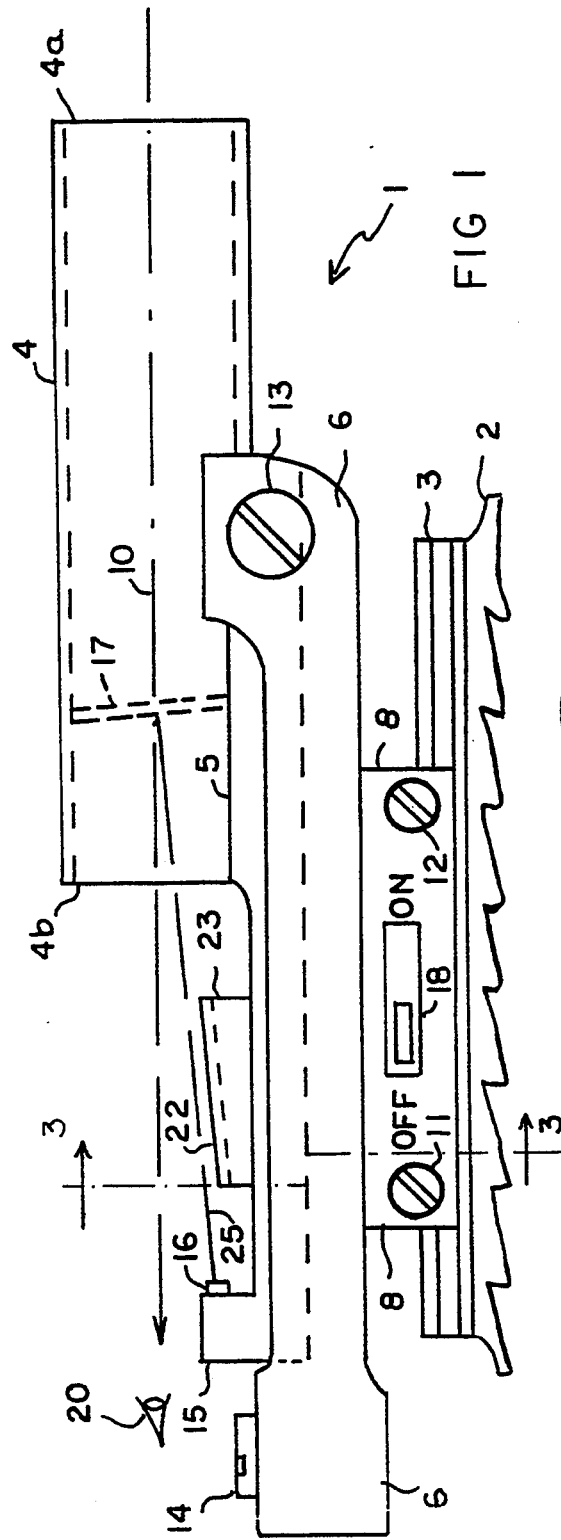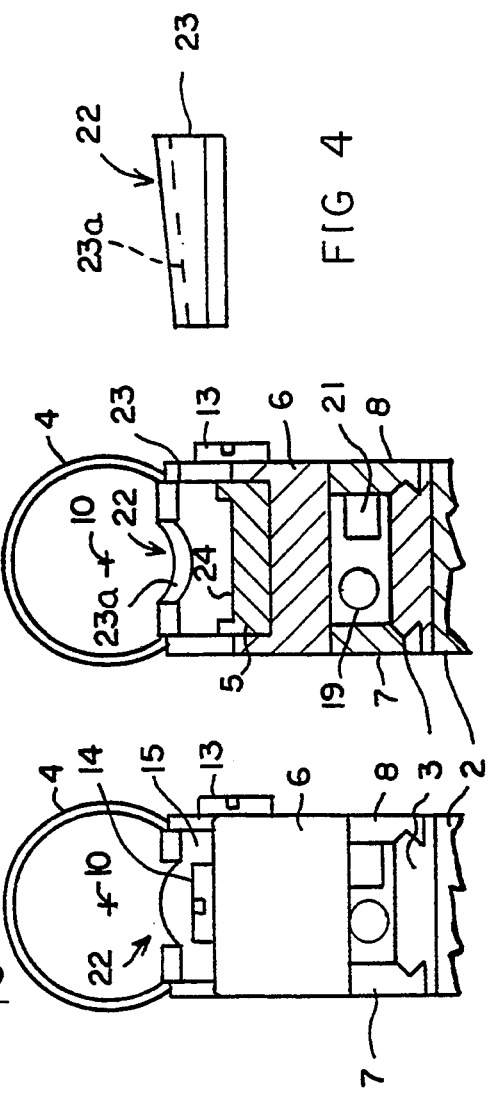
FIG 1
FIG 2
FIG 3
FIG 4

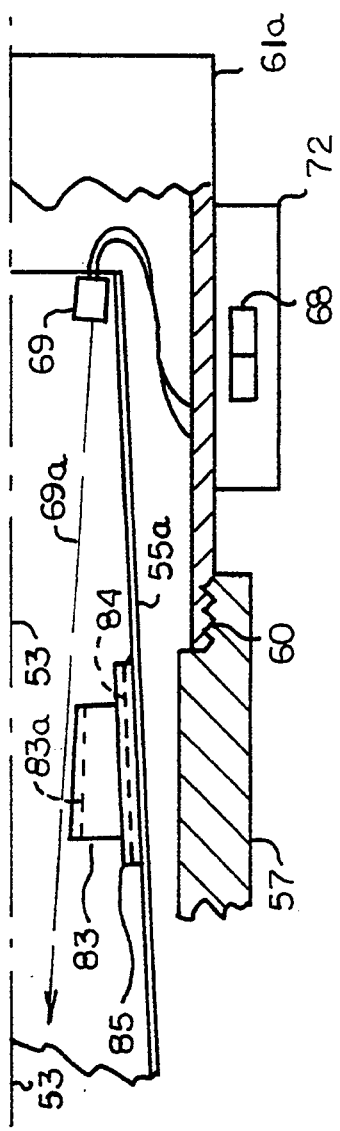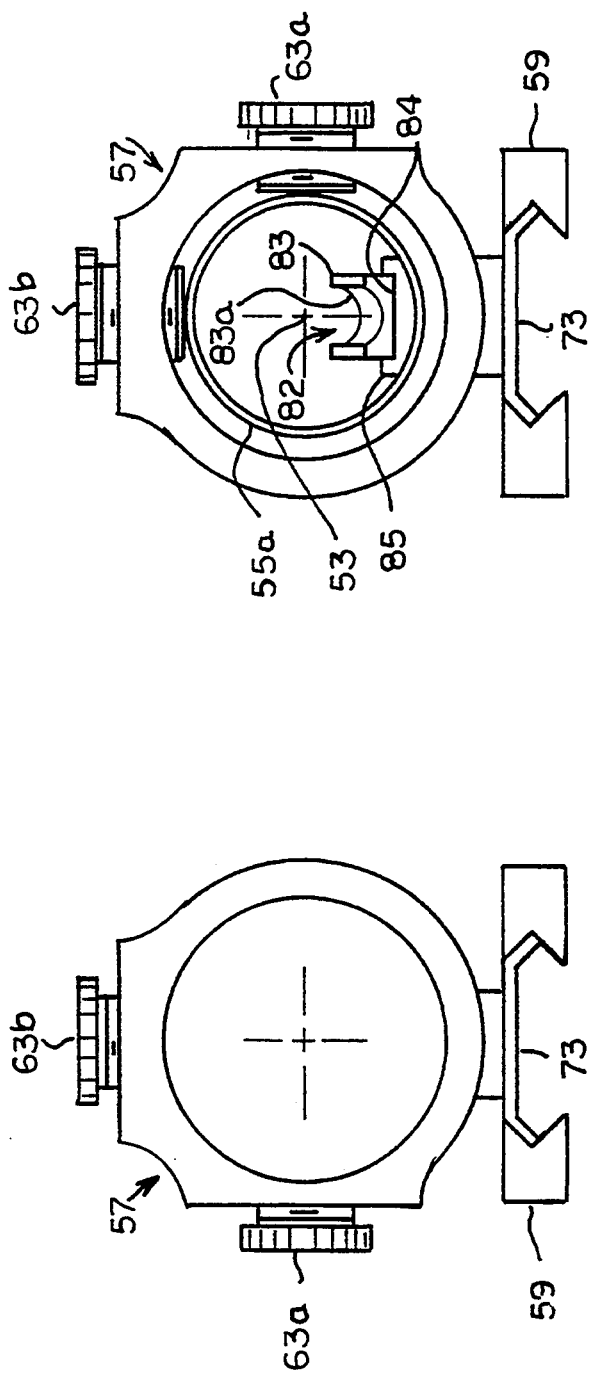

REFLEX LUMINOUS DOT SIGHTING INSTRUMENT WITH UNDESIRED DOT LIGHT BLOCKING

BACKGROUND OF THE INVENTION

This invention relates to luminous dot sighting instruments and more particularly to such instruments used in connection with a telescope on a firearm as an aid to sighting the firearm on a target.

Optical sighting instruments having a sighting tube have included cross hairs in the tube to define the optical center of the instrument. The user, such as a firearm marksman, looks into the sight and places the cross hairs on the target in the view to aim the firearm. The cross hairs are illuminated by light from the view. At twilight, in haze or fog and at other times when visibility is low, the cross hairs are difficult to see, and at night they cannot be seen at all. One solution to this problem has been the luminous dot sighting instrument.

A luminous dot sighting instrument is used to view a target and is usually attached to a rifle or other firearm to sight the rifle on the target. The luminous dot is generated inside the instrument and is superimposed on the view of the target by a transparent mirror in the instrument. The mirror is transparent to light from the target scene and reflects light from the luminous dot. In this way the luminous dot is superimposed on the target scene as viewed through the instrument and serves the purpose of the cross hairs. Thus, this type of sighting instrument is called a reflex luminous dot sighting instrument. It does not depend on light from the view and can be made as bright as desired by the user by controlling the brightness of the luminous dot source.

The instrument is often a sighting tube containing the transparent mirror (window/mirror) and the luminous dot source is a light emitting diode (LED) inside the tube. With the sighting tube are also a battery, brightness control circuit and switch for the LED, usually fixedly attached to the tube. Or the sighting instrument may be a telescope, in which case the LED is inside the telescope and the battery, control circuit and switch are carried on the outside of the telescope as part thereof. In either case, the instrument is attached to a rifle to aid the user in pointing the rifle to hit the target viewed through the instrument.

In such reflex luminous dot sighting instruments, with or without a telescope, the LED is contained in the instrument wherein light is projected from the LED onto a tilted window or lens that has a mirror coating so that light from the view passing through the lens is joined by light from the diode that reflects from the mirror coating. The user looking into the instrument attached to his rifle sees the target view with the luminous dot at the center and points the rifle to place the dot on the target in the view and fires the rifle. With a properly mounted and adjusted sighting instrument the user can quickly view the target area, put the dot on the target and fire the rifle with great accuracy.

Heretofore, a number of reflex type luminous dot sighting instruments, some with telescopes and some without, have been used with adjustments for range and windage to be made by the firearm user. The adjustments for range and windage are adjustments in elevation angle and azimuth angle, respectively, of the instrument with respect to the firearm and are set by the user using his estimates of range and windage. In all of these, the target view and the luminous dot are combined by the tilted window or lens with a mirror coating and light from the target view passes through the tilted lens while light from the LED that forms the luminous dot reflects from the lens mirror coating. Also, in all of these, the LED is contained within the sighting tube or telescope and is powered by a battery in circuit with the LED and a brightness control and/or switch, all attached to and carried by the tube or telescope. Thus, each sighting tube or telescope comes equipped with the LED, battery and brightness control and/or switch.

Where a telescope is included, the light from the LED is focused by the lens/mirror on the same image plane as the target view so that the user sees the target view and the luminous dot all in focus at the same plane with the luminous dot precisely at the center of the target view. The LED is enclosed within the telescope by an aperture that directs the LED light as a narrow angular cone to the center of the tilted lens. Thus, the luminous dot appears to the user the same size, shape and color for all target views, at the center of the target view, whether the target is far or near (long or short range elevation) and whether there is any adjustment for windage, left or right.

Such a luminous dot sighting instrument including a telescope is described in my U.S. Pat. No. 5,205,044, issued Apr. 27, 1993, entitled Luminous Dot Sighting Instrument.

In a reflex luminous dot sighting instrument, as mentioned above, the brightness of the dot is independent of ambient light and can be increased by increasing electric power to the LED. However, as the dot is made brighter to the observer it loses definition and becomes larger. The applicant has discovered that this loss of definition is caused mainly by undesired reflections of the LED light before it reaches the tilted window or lens. The undesired reflections appear to increase as power to the LED is increased. This is probably due to increased divergence of the luminous dot beam as power is increased.

In the past, the loss of definition with greater dot brightness has been partly eliminated by using high quality windows and lenses coated with high quality mirror reflecting layers that selectively reflect the dot source light and not the target scene light and the use of black dull coating inside the sighting tube and inside the telescope.

SUMMARY OF THE INVENTION

It is an object of all embodiments of the present invention to provide a reflex luminous dot sighting instrument wherein undesired reflections of the luminous dot light are blocked so that they do not reach the user's eye.

It is another object of all embodiments of the present invention to provide a reflex luminous dot sighting instrument wherein undesired luminous dot light divergence is limited and blocked so that it does not reach the user's eye.

It is another object of all embodiments of the present invention to provide a reflex luminous dot sighting instrument wherein luminous dot light that causes a loss of definition of the luminous dot when the dot is made brighter is blocked so that it does not reach the user's eye.

It is another object of all embodiments of the present invention to provide a reflex luminous dot sighting instrument wherein undesired reflections of the luminous dot light that occur between the source of luminous dot light and the user's eye, are blocked so that they do not reach the user's eye.

It is another object of all embodiments of the present invention to provide a reflex luminous dot sighting instrument wherein undesired reflections of LED luminous dot light that occur between the LED and the tilted window or lens, are blocked so that they do not reach the user's eye.

It is another object of the first embodiment of the present invention to provide a reflex luminous dot sighting instrument wherein undesired reflections of luminous dot light that occur between the Led and the instrument housing are blocked so that they do not reach the user's eye.

It is another object of the first embodiment of the present invention to provide a luminous dot sighting instrument wherein the luminous dot source is carried outside of the instrument tube or 25 telescope so that the instrument can be removed and/or replaced without removing the luminous dot source.

It is a another object of the first embodiment of the present invention to provide s luminous dot sighting instrument on a firearm for sighting the firearm, wherein the luminous dot source is carried on the firearm independent of the instrument sighting tube or telescope, so that the instrument can be removed from the firearm and/or replaced on the firearm without removing the luminous dot source.

It is a further object of all embodiments of the present invention to provide an instrument for a firearm wherein a battery or its equivalent for powering the luminous dot source and brightness controls and switches for the luminous dot source are all carried on the firearm independent of the sighting instrument tube or telescope, so that the instrument tube or telescope can be removed from the firearm and/or replaced on the firearm without removing the luminous dot source, battery, controls and switches.

It is a further object of all embodiments of the present invention to provide a luminous dot sighting instrument for a firearm wherein a battery or its equivalent for powering the luminous dot source and brightness controls and switches for the luminous dot source are all carried in a common envelope on the firearm independent of the sighting instrument tube or telescope and that envelope can be removed from the firearm and/or replaced on the firearm with the same or a different sighting instrument tube or telescope.

According to all embodiments of the present invention, a reflex luminous dot sighting instrument includes a tube or telescope housing containing a tilted window or lens having a coating for reflecting the luminous dot light, mounted on a firearm for sighting the firearm by the user's eye positioned along the optical axis of the instrument. Means are provided for blocking undesired reflections of luminous dot light so that they do not reach the eye, including a contoured non-reflective surface alongside the path of luminous dot light from the source thereof to the coated window for reflecting the luminous dot light. In preferred embodiments, the blocking means also blocks undesired diverging rays of luminous dot light.

The first embodiment includes a sighting tube having an objective end and an ocular end defining an optical axis, a tilted window/mirror along the optical axis between the ends for transmitting the target view light while reflecting light from an LED luminous dot source that is outside the tube between the eye and the ocular end of the tube, so that the target view and the LED source are visible at the ocular end of the housing along the optical axis with the source image superimposed on the target view image. The contoured non-reflective surface for blocking undesired reflections of luminous dot light so that they do not reach the eye is positioned alongside the light path from the LED source to the tilted window/mirror of the instrument.

A novel configuration of this first embodiment is achieved by separating the LED source and its battery, brightness control and switch from the sighting tube and carrying them in a common envelope on the firearm independent of the sighting tube, and that. envelope can be removed from the firearm and/or replaced on the firearm with the same or a different sighting tube.

A second embodiment includes a telescope containing therein an tilted lens/mirror along the optical axis between the ends for transmitting the target view light while reflecting light from an LED source that is inside the telescope between the objective and ocular ends of the telescope, so that the target view and the LED source are visible at the ocular end with the LED source superimposed on the target view. The contoured non-reflective surface for blocking undesired reflections of LED light so that they do not reach the eye is positioned alongside the light path from the LED source to the tilted lens of the telescope.

Other objects of the invention and features are apparent to those skilled in the art from the following description of the embodiments taken in conjunction with the figures.

BRIEF DESCRIPTION OF THE DRAWINGS

FIG. 1 is a side view of a reflex luminous dot sighting instrument assembly according to the first embodiment of the invention showing the instrument sighting tube, mount to the firearm, envelope for the LED, battery, brightness control and switch and the contoured surface along the LED light path for blocking undesired reflections of LED light from reaching the user's eye;

FIG. 2 is an [objective] end view of the assembly of FIG. 1 from about the position of the user's eye;

FIG. 3 is an end cross section view of the assembly of FIG. 1 from a position between the user's eye and the sighting tube;

FIG. 4 is a side view of the piece providing the contoured surface along the optical path for blocking undesired reflections of LED light from reaching the user's eye;

FIG. 6 is an enlarged objective end view of the telescope and mount of FIG. 5;

FIG. 7 is an enlarged cross section end view of section BB of the telescope and mount of FIG. 5; and FIG. 8 shows an enlarged part of FIG. 5 showing details of the piece 83 for blocking undesired LED light.

DESCRIPTION OF EMBODIMENTS OF THE INVENTION

Figure 5:
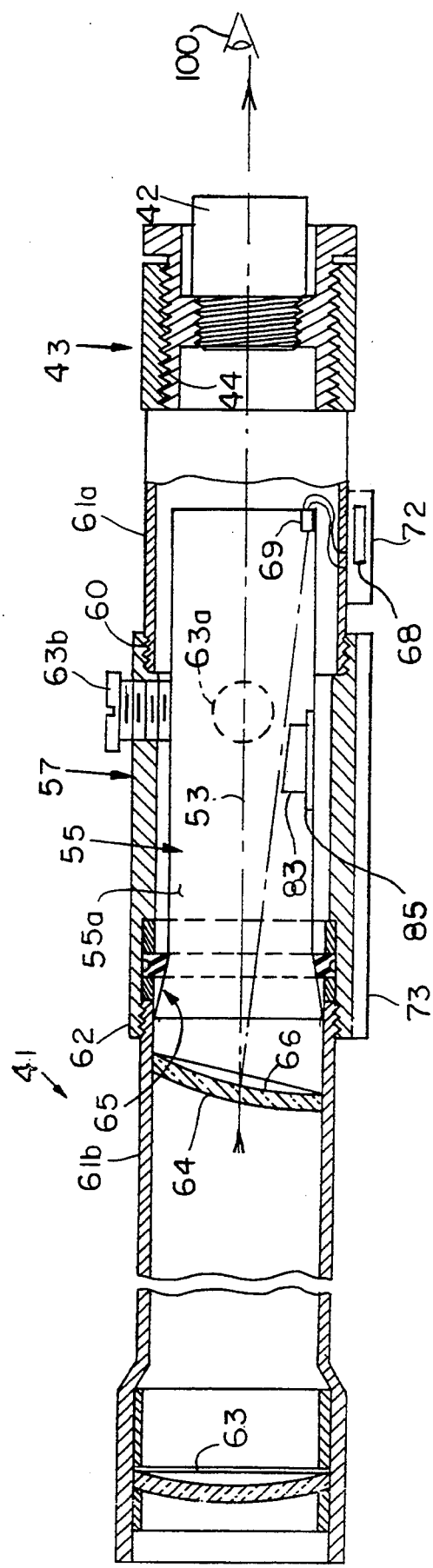
FIG. 5 is an axial cross section view of the second embodiment that includes a telescope with the LED luminous dot source inside and an integral mount containing the LED battery, brightness control and switch and the contoured non-reflective surface along the LED light path inside the telescope for blocking undesired reflections of LED light from reaching the user's eye.

Embodiments of the present invention have in common that they are reflex luminous dot sighting instruments with a contoured non-reflective surface along the luminous dot light path of the instrument between the luminous dot source and the tilted window/mirror of the instrument so that undesired reflections of the luminous dot light do not reach the eye.

First Embodiment - Reflex Luminous Dot Sighting Tube

Turning first to FIGS. 1 to 4, there is shown the complete instrument assembly 1 mounted on a rifle 2 dovetail 3. The sighting instrument includes the sighting tube 4 mounted by a releasable attachment (not shown) to runway 5 so that the tube optical axis 10 is parallel to the runway. The runway is held by and can be positioned with respect to yoke 6 and the yoke is attached to the rifle dovetail 3 by the yoke legs 7 and 8 that straddle the rifle dovetail and are secured thereto by set screws 11 and 12 so that the assembly stands with the sighting tube axis 10 at the desired position above the rifle barrel.

Runway 5 position in the yoke is variable in azimuth and in elevation with respect to the yoke; and since the sighting tube is secured to the runway and the yoke when secured to the rifle as described is parallel to the rifle barrel, varying the azimuth and elevation settings for the runway with respect to the yoke, varies the azimuth and elevation of the sighting tube with respect to the rifle barrel. For this azimuth and elevation setting, azimuth or windage control screw 13 and elevation control screw 14 are provided. Screw 13 turns the runway tilt left or right with respect to the yoke so that the longitudinal axis of the runway is turned left or right from parallel with the longitudinal axis of the yoke, Similarly, screw 14 turns the runway tilt up or down with respect to the yoke so that the longitudinal axis of the runway is tilted up or down from parallel with the longitudinal axis of the yoke.

On the runway pedestal 15, immediately in front of the user's eye 20 is mounted LED 16, optically pointing at the center of the tilted window/mirror 17, which is inside sighting tube 4 substantially centered on the optical axis 10. As a result, the user at 20 sees the target scene through the sighting tube with the luminous dot at the center of the target scene and when the windage and elevation is properly set the rifle projectile will hit the target point marked by the luminous dot.

The On-Off switch 18 for the LED is mounted for convenient access on the right leg 8 of the yoke and the battery 19 and brightness control circuits 21 for the LED may be carried by the yoke between the legs as shown and suitable electric leads from these circuits to the LED are provided, but not shown. Thus, the sighting tube can be removed from the runway and replaced by another to be used with the assembly of runway and LED and yoke and LED controls; and the runway and LED can be disengaged from the yoke and the electric leads to the LED unplugged and replaced by another runway and LED.

First Embodiment - Blocking Undesired Reflections

A contoured non-reflective surface 22 for blocking and deflecting undesired reflections and diverging rays of luminous dot light so that they do not reach the eye is provided by light blocker 23, which is a moveable piece positioned in groove 24 of runway 5 alongside the the luminous dot light path 25 from LED 16 to tilted mirror/window 17 at the ocular end 4b of the sighting tube. A shallow depression 23a in surface 23 can be provided to provide a non-reflective surface concentric with luminous dot light path 25 from the LED to the center of window/mirror 17.

All exposed surfaces of light blocker 23 are treated to be non-reflective and so the entire piece blocks light impinging on it by absorbing the light; and where such light is reflected due to a shallow angle of incidence, the shape of the surface is such that the direction of reflection is not to a light path that reaches the user's eye. The contoured surface 23 and the position of that surface with respect to LED 16, window/mirror 17 and the usual position of the user's eye 20 are such that undesired reflections of LED light and excessively diverging rays of LED light are intercepted by blocker 23 and either blocked by being absorbed or reflected away from the user's eye.

The position of luminous dot light blocker 23 along runway is adjustable. The user simply slides it along runway groove 24 to the position where the undesired reflections of LED light is least troublesome. The fit of light blocker 23 in groove 24 is preferably such that the friction therebetween is sufficient to hold it where positioned, yet allows moving it in the groove with finger force.

Second Embodiment - Reflex Luminous Dot Sighting Telescope

FIG. 5 is a schematic cross section view of a luminous dot sighting instrument 41 that includes an eyepiece attachment 42 which are detachably interconnected by means 43 including threads 44 whereby the eyepiece is screwed into the ocular end of the instrument and the combination of a lens system (a lens) in the instrument and the eyepiece forms a telescope.

The optical system of instrument 41, in addition to the eyepiece, includes a lens system having a tilted lens/mirror 64 and LED 69 inside the telescope. The LED is energized by a battery 70 (not shown) through an electronic circuit 71 (not shown) and switch 68, which are contained in outside envelope 72. The instrument 41 is generally tubular and has a mounting attachment 73 for attachment to an accommodating holder 59 that is attached to a rifle. Means are provided for elevation and azimuth angular adjustment of the instrument with respect to the mounting attachment (in relation to the rifle) operative between the optical section 55 of the instrument and that part 57 which encompasses the optical system 55 so that angular adjustment of the optical section can be made to account for range and windage (elevation and azimuth).

As shown in FIG. 5, the ocular end of tube 57 is connected at 60 via screw threads with rear tubular member 61a forming the rear part of the instrument and supporting the eyepiece 42 at connection 43 or supporting an entire telescope (not shown). Front tubular member 61b is screwed into the front end of 57 at 62 via screw threads and is closed at its front end, the objective end, by protective window 63.

Thus, tubular members 57, 61a and 61b form a composite continuous outer tube in which tubular housing 55a accommodating the optical system 55 is suspended so that the optical system is moveable for elevation and azimuth angular adjustment by means of two adjusting screws 63a and 63b along horizontal and vertical axes to adjust for windage and range, respectively, as shown also in FIG. 6. At the front of tube 55a is carried tilted parabolic lens 64 that has a semi-transparent mirror coatings 66 at its front surface for reflecting light from LED 69 mounted inside tube 55a.

The front end of tube 55a is pivotally supported by tube 57 at pivotal support 65 that acts as a universally articulating spring loaded suspension of the optical system 55. When the angular adjustment of tube 55a is changed by manipulating screws 63a or 63b, the optical system 55 is changed, the luminous dot (light from LED 69) incident upon mirror coating 66 of lens 64 is displaced with it, because the LED is attached to tube 55a.

Second Embodiment - Blocking Undesired Reflections

A contoured non-reflective surface 82 for blocking undesired reflections and diverging rays of LED light so that they do not reach the eye is provided by light blocker 83, which is a moveable piece positioned in groove 84 of runway 85 alongside the luminous dot light path 69a from LED 69 to tilted lens/mirror 64. A shallow depression 83a in surface 83 can be provided to provide a non-reflective surface concentric with light path 69a.

All exposed surfaces of light blocker 83 are treated to be non-reflective and so the entire piece blocks light impinging on it by absorbing the light; and where such light is reflected due to a shallow angle of incidence, the shape of the surface is such that the direction of reflection is not along a light path to the user's eye. The contoured surface 83 and the position of that surface with respect to the position of LED 69 is such that undesired reflections of LED light is intercepted by light blocker 83 and either absorbed or reflected away from the user's eye.

The position of light blocker 83 along runway 85 is adjustable. To adjust it, the telescope eyepiece 42 is removed and the user simply slides it along runway groove. 84 to the position where undesired reflections of luminous dot light is least troublesome. The fit of deflector 83 in groove 84 is preferably such that the friction therebetween is sufficient to hold it where positioned, yet allows moving it in the groove with finger force.

While the invention described herein Is described in connection with several embodiments, it will be understood that it is not intended to limit the invention to those embodiments. It is intended to cover all alternatives, modifications, equivalents and variations of those embodiments and their features as may be made by those skilled in the art within the spirit and scope of the invention as defined by the appended claims.

I claim:

1. In a sighting instrument used by an observer for sighting a device on a target, that includes a housing having an objective end and an ocular end defining an optical axis, an aperture at said objective end of said housing for admitting light from a target view along said optical axis, a source of luminous dot light off of said optical axis, means along said optical axis for reflecting said luminous dot light while transmitting said target view light, said luminous dot light from said source being directed along a luminous dot light path to said means for reflecting, whereby said target view and said luminous dot are visible to an observer's eye at said ocular end of said housing along said optical axis with said luminous dot superimposed on said target view, the improvement comprising, (a) means for blocking undesired reflections of luminous dot light so that said undesired reflections of luminous dot light do not reach said observer's eye, including, (b) a contoured non-reflective surface alongside said luminous dot light path.

2. A sighting instrument as in claim 1, wherein, (a) means are provided for varying the position of said contoured non-reflective surface alongside said luminous dot light path.

3. A sighting instrument as in claim 1, wherein, (a) said means for reflecting luminous dot light while transmitting target view light is in said housing between said objective and ocular ends thereof.

4. A sighting instrument as in claim 1, wherein, (a) said contoured non-reflective surface and the position thereof between said source of luminous dot light and said means for reflecting luminous dot light while transmitting target view light are such that said undesired reflections of luminous dot light are absorbed or reflected away from said observer's eye by said contoured non-reflective surface.

5. A sighting instrument as in claim 1, wherein, (a) undesired reflections of ambient light from said instrument occur between said ocular end of said housing and said observer's eye and (b) said undesired reflections of ambient light are absorbed or reflected away from said observer's eye by said blocking means.

6. A sighting instrument as in claim 1, wherein, (a) said means for reflecting luminous dot light while transmitting target view light is a tilted window coated with a reflecting layer, (b) said source of luminous dot light is an LED located off of said optical axis between said tilted window and said observer's eye and (c) said tilted window transmits said target view light while reflecting said LED light.

7. A sighting instrument as in claim 6, wherein, (a) said LED is located between said ocular end of said housing and said observer's eye and, (b) said means for blocking is located between said ocular end of said housing and said LED.

8. A sighting instrument as in claim 6, wherein, (a) said LED is oriented so that said LED light is directed toward said tilted window at the intersection of said optical axis therewith.

9. A sighting instrument as in claim 8, wherein, (a) said contoured non-reflective surface is longitudinally substantially parallel to the direction of said LED light toward said tilted window.

10. A sighting instrument as in claim 9, wherein, (a) said contoured non-reflecting surface in part defines a longitudinal surface that is concentric with the line of direction of said LED light from said LED to said tilted window.

11. A sighting instrument as in claim 10, wherein, (a) said means for blocking is readily positioned longitudinally alongside said luminous dot light path to absorb and/or reflect said undesired reflections of LED light so that said undesired LED light do not reach said observer's eye.

12. A sighting instrument as in claim 6, wherein, (a) a battery and a control circuit are provided for said LED, (b) whereby said observer can readily control the brightness of said LED.

13. A sighting instrument as in claim 12, wherein, (a) said LED, battery and control circuit are contained in an assembly to which said housing is attached.

14. A sighting instrument as in claim 12, wherein,
(a) said LED, battery and control circuit and said means for blocking are contained in an assembly to which said housing is attached.

15. A sighting instrument as in claim 14, wherein,
(a) said LED, battery, control circuit and blocking means assembly is attached to said device and
(b) said housing is attached to said assembly.

16. A sighting instrument as in claim 6, wherein,
(a) said housing contains a telescope with an eyepiece at said ocular end,
(b) said tilted window is a coated tilted lens of said telescope,
(c) said LED is located inside of said telescope housing and
(d) said means for blocking is located between said LED and said tilted lens.

17. A sighting instrument as in claim 16, wherein,
(a) said housing and means for blocking are carried on a common platform attached to said device.

18. In a luminous dot sighting instrument used by an observer to sight a device on a target, that includes a source of luminous dot light, a tilted, coated window that reflects said luminous dot light while transmitting light from said target and means providing a luminous dot light path from said source of luminous dot light to said tilted coated window, to the observer's eye and a target light path from said target through said tilted coated window to said observer's eye, so that said target light and said luminous dot light are visible to said observer's eye with said luminous dot superimposed on said target, the improvement comprising,
(a) means including a contoured non-reflective surface alongside said luminous dot light path between said source of luminous dot light and said tilted, coated window, for blocking undesired luminous dot light so that it is not visible to the observer.

19. A sighting instrument as in claim 18, wherein,
(a) said luminous dot light path from said tilted, coated window to the observer's eye is coincident with part of said target light path.

* * * * *